Sept. 17, 1968     M. M. HANN ET AL     3,401,522
HYDROSTATIC TRANSMISSION
Filed Aug. 31, 1966                                                 2 Sheets-Sheet 1
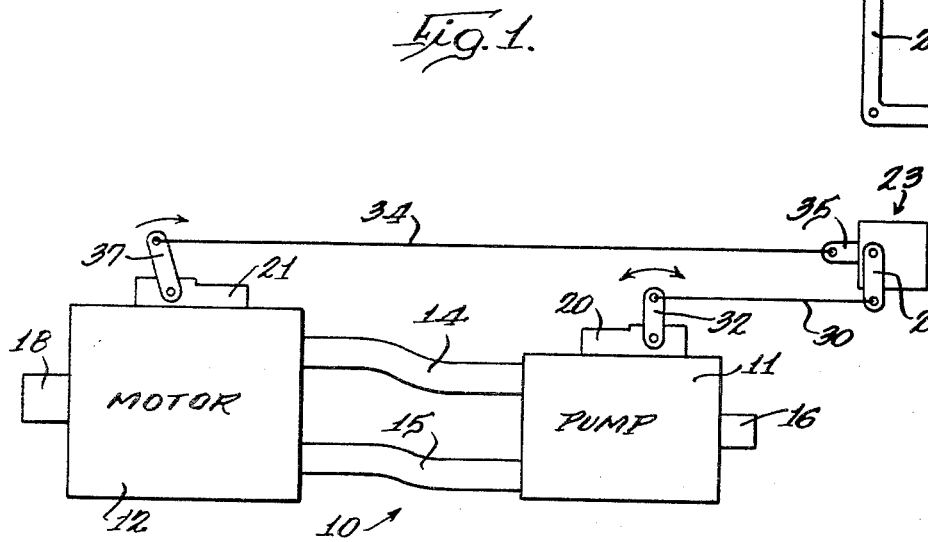
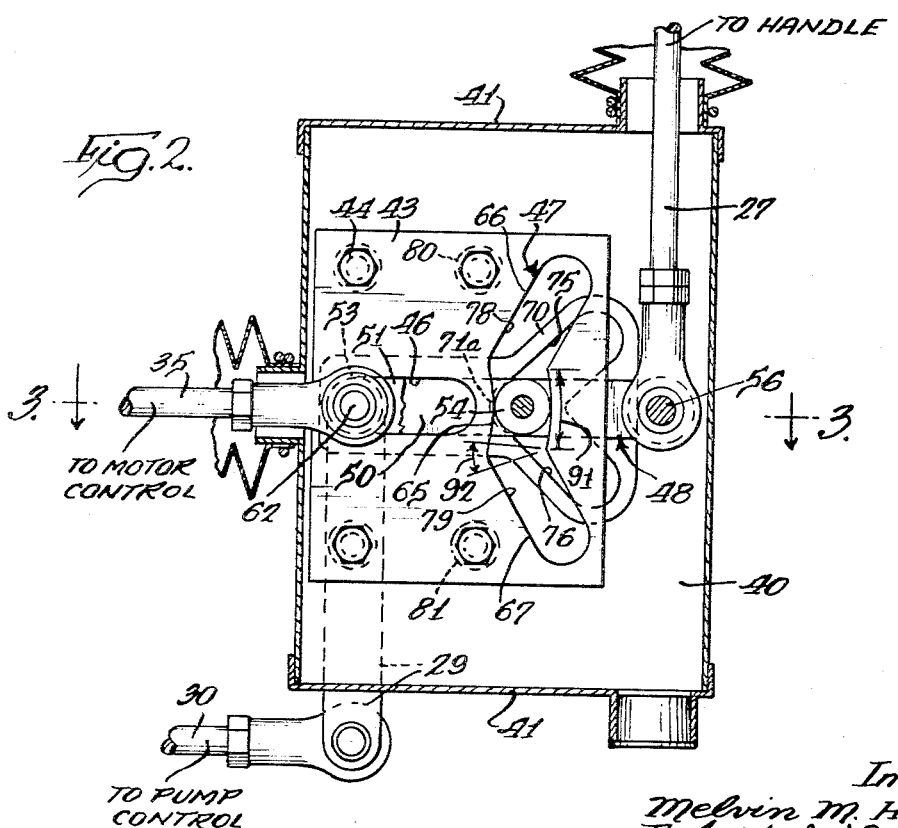
Inventors
Melvin M. Hann
Robert J. Lease
By Hofgren, Wegner,
Allen, Stellman & McCord Attys

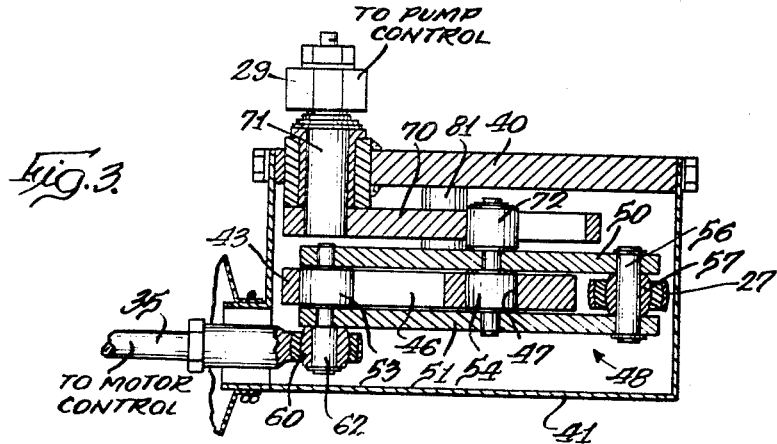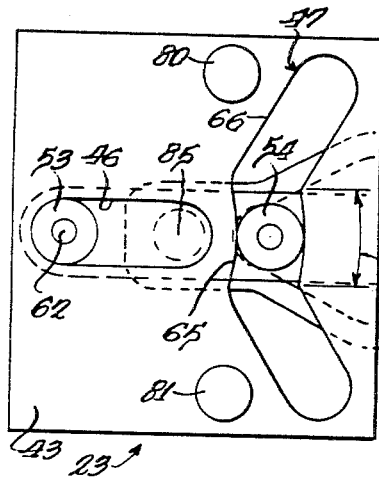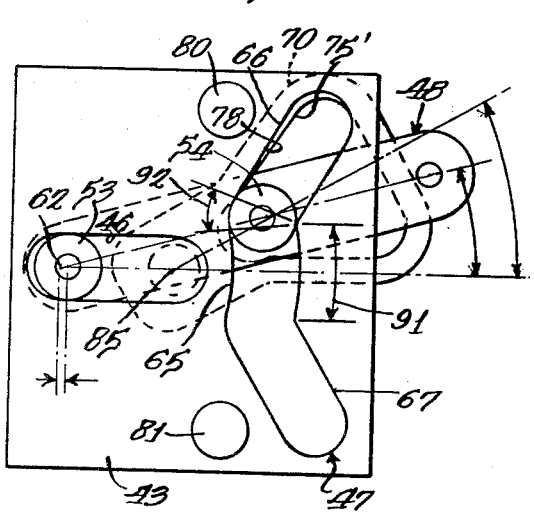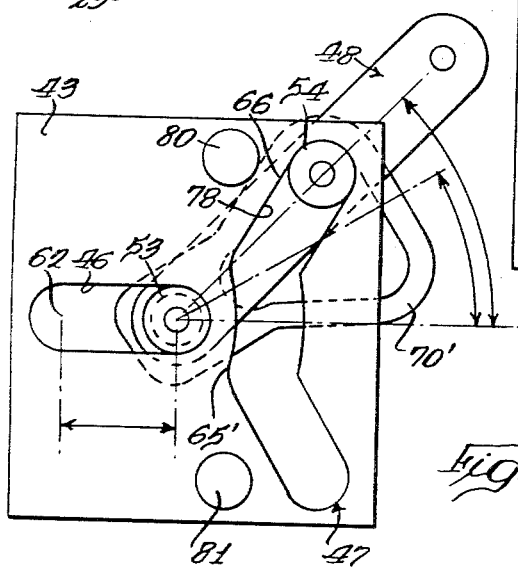

United States Patent Office 3,401,522
Patented Sept. 17, 1968

3,401,522
HYDROSTATIC TRANSMISSION
Melvin M. Hann, Ottawa, and Robert J. Lease, La Salle, Ill., assignors to Sundstrand Corporation, a corporation of Delaware
Filed Aug. 31, 1966, Ser. No. 576,478
10 Claims. (Cl. 60—53)

ABSTRACT OF THE DISCLOSURE

A displacement control for staging the displacement changes of the pump and motor in a variable hydrostatic transmission including a control link that first pivots and then translates in response to a manual operator, the control link being connected so that the pivotal movement thereof controls the pump displacement through a pivoting cam and so that the translating movement thereof controls the motor displacement.

---

This invention relates generally to hydrostatic transmissions and more particularly to a control assembly for varying the speed ratio of a hydrostatic transmission.

Transmissions of this type frequently include a variable displacement pump connected to deliver hydraulic fluid under pressure to a variable displacement hydraulic motor. It is desirable in such transmissions to vary the displacement of the pump and the motor in a way to provide optimum output speed and torque characteristics for the particular application involved.

In accordance with the present invention, a displacement control is provided which with a single manual input will select an infinite number of pump and motor displacement relationships automatically to obtain the optimum output speed and torque characteristics. In one application of a hydrostatic transmission of the type described, the pump has a reversible displacement control movable from neutral to maximum displacement positions on either side of neutral to provide reversible motor rotation. The motor displacement control is movable from a maximum displacement position to a minimum displacement position. Phasing the motor displacement control with the pump displacement control improves the performance characteristics of the transmission. That is, as the manual input is moved from its neutral position towards its maximum speed position in either direction the pump displacement is increased while the motor is held in its maximum displacement position providing high torque and low output speeds. When the pump nears maximum displacement, the motor displacement begins to reduce. Additional control motion further reduces motor displacement until it reaches its minimum displacement during which time the output speed of the motor and the associated vehicle increases, and the pump is held in its maximum displacement position.

The present control effects this phasing with a single operator controlled lever which positions a pivotal and slidable control link. Cam means are provided for causing the control link to pivot during a first portion of the movement of the control lever causing an increase in the displacement of the pump, and to translate during a second portion of the movement of the control lever to cause a reduction in the displacement of the motor while holding the pump displacement at its maximum value thus bringing the transmission up to speed.

It is therefore a primary object of the present invention to provide a new and improved hydrostatic transmission of the type described.

It is another object of the present invention to provide a new and improved control assembly for phasing the displacement of the pump and motor in a hydrostatic transmission with a single control lever which increases the displacement of the pump while holding the motor at maximum displacement and thereafter decreases the displacement of the motor while holding the pump at maximum displacement to optimize the performance of the transmission.

Another object of the present invention is to provide a control for a hydrostatic transmission of the type described immediately above with a pivotal and slidable control link guided by cams for initial pivotal movement by the control lever to cause adjustment of the pump displacement while locking the motor in maximum displacement, and for subsequent translatory movement to effect a reduction in the displacement of the motor while locking the pump in maximum displacement.

A more specific object of the present invention is to provide a control for a hydrostatic transmission of the type described above including a generally V-shaped pivotal cam connected to reversibly vary the pump displacement and connected to be pivoted by the pivotal movement of the control link and which is locked in position by the control link and suitable stop means when the control link translates to reduce the displacement of the motor.

A still further object of the present invention is to provide a control for a hydrostatic transmission of the type described above in which the cam for guiding movement of the control link includes a cam plate having a first elongated slot for guiding one end of the control link in rectilinear translatory movement and having a second slot for receiving a follower on the control link, which slot has a central portion concentric with one end of the first slot to effect pure pivotal movement of the control link and outwardly extending portions from the concentric portion to effect translatory movement of the control link, with a smooth transition portion interconnecting the outwardly extending portions and the concentric portion preferably having a radius of one-half of the width of the second slot, so that just before the pump reaches its maximum displacement the motor slowly begins a reduction in displacement to effect a smooth transition between pump and motor control phases.

Other objects and advantages will be apparent from the following detailed description taken in connection with the accompanying drawings in which:

FIG. 1 is a schematic illustration of the present hydrostatic transmission and control;

FIG. 2 is an enlarged cross section of a control assembly shown in FIG. 1;

FIG. 3 is a cross section taken generally along line 3—3 of FIG. 2 showing the control linkages; and FIGS. 4 to 6 are schematic position illustrations of a control assembly similar to that shown in FIGS. 2 and 3 in different operation positions.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings and particularly FIG. 1, a hydrostatic transmission 10 is seen to include a reversible variable displacement pump 11 and a variable displacement motor 12 interconnected by hydraulic conduits 14 and 15 which are adapted to convey fluid from the pump 11 to the motor 12 and return fluid from the motor to the pump in closed circuit fashion. The pump 11 and the motor 12 may take varied forms within the scope of the present invention, but as an example these hydraulic units may be of the axial multiple piston type having a pivotally adjustable cam member for varying the displacement of the units such as disclosed in U.S. Hann Patent No. 3,212,263, dated Oct. 19, 1965, assigned to the assignee of the present invention. The transmission 10 is suitable for use as a vehicular transmission and the input shaft 16 for the pump is adapted to be driven by the prime mover for the vehicle, and the output shaft 18 is adapted to be connected to drive the vehicle wheels or other propelling means.

The displacements of the pump and motor are controlled respectively by servo valves 20 and 21, each of which serves to deliver fluid to one or two servomotors in the hydraulic units which position the displacement cams in conventional fashion.

A control assembly 23, in accordance with the present invention, is provided for positioning the valves 20 and 21. An input signal to the control assembly is provided by a pivotally mounted L-shaped lever 24 having a handle 25 for operator movement. The manually controlled lever 24 is connected to the control assembly 23 through a link 27. Movement of the pump valve 20 is effected by the assembly 23 through pivotal link 29, a generally horizontal link 30, and pivotal link 32. Similarly, movement of the motor valve 21 is controlled through a reciprocating link 35, a generally horizontal link 34 pivotally interconnecting the link 35 and a pivotal link 37 connected to valve 21.

In the neutral position shown, the link 37 is in its maximum displacement position so that the cam associated with the motor 12 is also in its maximum displacement position. Movement of the link 37 from this position to a position near vertical will move the motor cam from its maximum displacement position to a minimum displacement position somewhat greater than zero.

Further, the link 32 and valve 20 in the position shown maintain the cam of pump 11 in its neutral no-stroke position and the link 32 is movable in either direction from this position to increase the displacement of the pump 11 to a maximum value and obtain reversible rotation of output shaft 18.

As will appear hereinafter, movement of the operator handle 25 in either direction from its neutral position shown will initially pivot the link 32 in one direction without pivoting the link 37 to increase pump displacement, and further movement of the handle in the same direction will cause clockwise pivotal movement of the motor link 37 while maintaining the link 32 in its maximum position on one side of neutral so that the motor displacement is reduced while the pump displacement remains at a maximum value. It should be understood that in some applications the links 32 and 37 could be connected directly to the pivotal displacement control cams of the pump and the motor respectively and eliminate the necessity for the servo valves 20 and 21 and the associated control motors.

Turning in more detail now to the construction of the control assembly 23, and with reference to FIGS. 2 and 3, a base plate 40 is provided having a generally rectangular housing member 41 fastened thereto. A stationary cam plate 43 is mounted within the housing by suitable fasteners 44 fixed to the supporting plate 40, and it should be understood that the cam plate 43 is spaced from the plate 40, as shown in FIG. 3. The cam plate 43 has cam slots 46 and 47 for guiding and controlling the path of movement of a pivotal-sliding control linkage 48. As shown more clearly in FIG. 3, the control linkage 48 consists of two interconnected links 50 and 51 flanking the cam plate 43 and carrying cam follower rollers 53 and 54 engaging and riding in the cam slots 46 and 47 respectively. Note that the link 51 is broken away for clarity in FIG. 2. At one end, the links 50 and 51 are connected by a suitable pin 56 carrying a self-aligning pivot joint 57 that connects the linkage 48 with the end of the manually positioned rod 27, so that movement of the rod or link 27 effects sliding movement of the linkage 48 on the cam plate 43.

The other end of the linkage 48 carries a self-aligning pivot joint 60 having an axis coincident with the axis of follower roller 53 and connected to one end of the motor control link or rod 35.

The slot 46 is straight and substantially aligned with motor link 35 and confines the end of the linkage 48 carrying follower roller 53 to pure rectilinear movement to the right from point 62 shown in FIG. 2.

The slot 47 has a central portion 65 having a radius of curvature about point 62 so that the control linkage, when the follower roller 54 is in this portion of the slot, has simple pivotal movement about the stationary point 62. Extending outwardly from the arcuate portion 65 are straight opposed portions 66 and 67. When the follower roller 54 is in these portions of the slot, the control linkage 48 will translate and pivot with the follower roller 53 and the left end of the linkage 48 having rectilinear horizontal movement in slot 46 and the follower roller 54 having rectilinear movement upwardly to the right in FIG. 2 (or downwardly to the right depending on the direction of movement of the operator lever 24) causing the linkage 48 to translate in the slots. As the control linkage 48 moves outwardly in either of the slot portions 66 or 67, the motor linkage 35 moves to the right reducing the displacement of the motor 12.

A pump cam 70 is pivotally mounted about a stationary axis in the support member 40 as shown clearly in FIG. 3. Shaft 71 fixed to the pump cam 70 carries the link 29 which controls the pump servo valve 20. As shown in FIG. 2, the pump cam 70 is in its neutral position and the displacement of the pump 11 is zero; movement of the pump cam upwardly will drive the transmission 10 in one direction and movement downwardly will drive the transmission in the other direction. Cam 70 has a cylindrical cam surface 71a for receiving a follower roller 72 rotatably fixed to the control linkage 48 coincident with the axis of follower roller 54. Extending from the central cam surface 71a is a V-shaped cam surface defined by surfaces 75 and 76. Surfaces 75 and 76 are positioned so that when the roller 54 slides in slot portion 66, the surface 75 will be parallel with and aligned with the surface 78, and when the roller slides in slot portion 67, the surface 76 will be in line with surface 79.

Stops 80 and 81 are provided against which the pump cam 70 abuts when the roller 54 slides in slot portions 66 or 67 to lock the pump cam in either of its maximum displacement positions. These stops are fixed between the support plate 40 and the cam plate 43 and impaled by two of the fasteners 44.

Referring to FIGS. 4 to 6 for a description of the operation of the present device, these schematic illustrations have parts similar to but somewhat modified from those shown in FIGS. 2 and 3. Specifically, the cam 70' has a somewhat different configuration than cam 70 as will appear hereinafter. Cam 70' is pivotally mounted about an axis 85 much closer to the axis of roller 54 than in the FIGS. 2 and 3 construction. This has the effect of decreasing the angle of movement of the control linkage 48 during which the pump is stroked from neutral to maximum, i.e., it reduces the portion of the operator handle throw that is utilized to stroke the pump.

The control assembly 23, as shown in FIG. 4, is in its neutral position with the control linkage 48 disposed centrally with respect to slot 66' and the pump cam 70' aligned therewith. The pump 11 is in zero displacement and the motor 12 is in maximum displacement. The centerline of the cam follower 53 is coincident with point 62 so that the displacement of the motor rod or link 35 is zero.

To begin operation of the transmission the control handle 25 is displaced by the operator in either direction, depending upon the desired direction of rotation of the output shaft 18 and the direction of travel of the associated vehicle. The cam follower roller 54 then rotates toward the position shown in FIG. 5 in an arc of a radius equal to the distance between the rollers 53 and 54. As slot portion 65 is defined by an arc about point 62, the motor will be held in maximum displacement and the follower roller 72 will pivot the cam 70' through an angle greater than the angle of movement of the control linkage 48. It should be understood that the angle of movement of the pump cam 70' with respect to the control linkage 48 may be varied, as noted above, depending upon the location of the pump cam pivot axis 85 and this varies the amount of operator handle movement used to stage in the pump relative to the amount used to stage in the motor. During a substantial portion of the pump stroke, the roller 54 is in arc 91 and the motor is held at maximum displacement.

When the cam follower roller 54 reaches either limit of the arc 91 (defining slot portion 65), any further displacement of the control linkage 48 causes the cam follower 54 to enter a transition arc 92, as shown in FIG. 5. Arc 92 has a radius equal in length to one-half of the width of the cam slot 67 taken at the slot centerline so that the arc generated is a tangent to the arc of the central portion 65 and to the centerline of the straight portions 66 and 67. When the roller 54 is in this transition portion 92, cam roller 53 rises somewhat as shown in FIG. 5 beginning a decrease in the displacement of the motor and at the same time the pump displacement approaches its maximum value. Note that the cam surface 75' on the pump cam is not quite in line with the slot portion 66 in FIG. 5 so that the pump is at slightly less than maximum displacement.

The transition portion 92 of the slot 47 eliminates the possibility of a control dead-band in which no change in displacement in either the pump or motor occurs. Thus, the transition portion 92 eliminates this possibility by causing the motor displacement to begin decreasing before the pump reaches maximum displacement.

As the angle of the control linkage 48 is further increased from the horizontal neutral position to the limit of the transition arc 92, the roller 72 aligns the pump cam surface 75' with the cam surface 78 and the pump cam 70' engages stop 80. At this point, the pump cam is locked in position between the cam follower roller 72 and the stop 80 so that the pump is locked in its maximum displacement position. The pump cam is locked in this position throughout the remainder of travel of the control linkage 48. With further increase in the angle of inclination of the control linkage 48, follower roller 54 moves in the straight portion 66 of the cam slot 47 thereby translating the roller 53 in slot 46, causing reciprocating link 35 to rotate link 37, reducing the displacement of the motor 12. This motion continues until the cam roller 53 reaches the end of slot 46, at which time the motor is in minimum displacement.

Movement of the control linkage 48 back toward its neutral position simply reverses the sequence of the operation described above. If the control linkage 48 is moved in the opposite direction from neutral, the same sequence of events will occur except that the pump displacement will occur in the opposite direction reversing the direction of rotation of output shaft 18.

The shape of both the pump and the motor cams may be varied, as desired, to change the rate at which the displacements of the pump and motor vary in relation to the movement of the operator handle 25, and as noted above, the pivot point 85 (FIG. 4) of the pump cams 70 and 70' may be varied to vary the portion of the operator handle throw utilized to stroke the pump.

The design of the linkages and cams described above can provide for identical operation of the transmission in both directions of rotation, or may be modified to vary the degree and the timing of the various motions involved as the application requires.

We claim:

1. A hydrostatic transmission, comprising: a variable displacement pump; means for varying the displacement of the pump; a variable displacement motor; means for varying the displacement of said motor; conduit means for delivering fluid from the pump to drive the motor; and a linkage assembly for controlling both of said displacement varying means including a manually positionable link, a [pivotal] control link pivotal about an axis and connected to position one of said displacement varying means, means permitting translating movement of said control link and the pivotal axis thereof, means connecting said manual link to pivot and translate said control link, and link means positionable by said control link for controlling the other displacement varying means, said control link being constructed so that the pivotal movement thereof controls one displacement varying means and the translating movement thereof controls the other displacement varying means.

2. A hydrostatic transmission, comprising: a variable displacement pump; means for varying the displacement of the pump; a variable displacement motor; means for varying the displacement of said motor; conduit means for delivering fluid from the pump to drive the motor; and a linkage assembly for controlling both of said displacement varying means including a manually positionable link, a pivotal control link connected to position one of said displacement varying means, means permitting translating movement of said control link, means connecting said manual link to pivot and translate said control link, link means positionable by said control link for controlling the other displacement varying means, said manual link being movable from a neutral position to a maximum speed position, first cam means for limiting movement of said control link to pure pivotal movement during a portion of the movement of said manual link, and second cam means for guiding said control link in simultaneous pivotal and translating movement during another portion of the movement of the manual link, said one displacement varying means being controlled by translating movement of said control link, said link means for controlling the other displacement varying means including means responsive to the pivotal movement of said control link.

3. The combination as defined in claim 2, wherein said second cam means confines one end of said control link to rectilinear movement, said motor displacement varying means being connected to said one end of said control link, said link means for controlling the other displacement varying means including a pivotally mounted cam connected to control said pump displacement varying means, means on said control link spaced from said one end thereof for engaging and pivoting said pivotal cam, and means preventing pivotal movement of said pivotal cam during said other portion of movement of said manual link.

4. A hydrostatic transmission, comprising: a variable displacement pump; means for varying the displacement of the pump; a variable displacement motor; means for varying the displacement of said motor; conduit means for delivering fluid from the pump to drive the motor; and a linkage assembly for controlling both of said displacement varying means including a manually positionable link, a pivotal control link connected to position one of said displacement varying means, means permitting translating movement of said control link, link means positionable by said control link for controlling the other displacement varying means, a stationary cam plate for guiding said control link, a first cam slot in said plate for confining one end of said control link to rectilinear movement, a second cam slot in the cam plate, two spaced follower means on said control link engaging respectively said first and second slots, said second slot having a portion thereof concentric with one end of said first slot to guide said control link in pure pivotal movement during a portion of the movement of the manual link, said link means positionable by said control link including means responsive to pivotal movement of said control link for controlling the pump displacement varying means, said second slot having a portion extending outwardly from said concentric portion to translate the follower means in said first slot during another portion of the movement of said manual link, and means responsive to movement of the follower means in said first slot for controlling the motor displacement varying means.

5. The combination as defined in claim 4, wherein said second slot has a smooth transition portion joining said concentric and outward portions.

6. The combination as defined in claim 5, wherein said transition portion is arcuate and defined by a radius equal to one-half the width of the second slot whereby when the other of said follower means is in said transition portion, the pump and motor displacements will be varied simultaneously.

7. The combination as defined in claim 4, wherein said control link is movable in either direction from a neutral position to effect reversible operation of the transmission, said one end of said control link being connected to said motor displacement varying means to vary the motor from maximum displacement to minimum displacement in either direction of movement of said control link, said pump displacement varying means being movable from a neutral position to maximum stroke positions on either side of neutral, said manual link being movable from a neutral position to maximum speed positions on both sides of neutral, said link means positionable by said control link including a pivotally mounted cam having at least two cam surfaces generally defining a "V" shape, means connecting said cam to control the pump displacement varying means, means on said control link slidably engaging said generally V-shaped cam, said second slot in the cam plate having a second outwardly extending portion to accommodate reversible movement of the control link, said pivotal cam being pivotal to positions where the cam surfaces are aligned with one side of each of said second cam slot outwardly extending portions whereby the pivotal cam will remain stationary when one of the follower means slides in said outwardly extending portions.

8. The combination as defined in claim 7, including stops mounted on said cam plate for limiting movement of the pivotal cam in both directions from a neutral position.

9. A hydrostatic transmission comprising: a first hydraulic unit, a second hydraulic unit, conduit means interconnecting said hydraulic units, means for varying the displacement of at least one of said hydraulic units; and linkage means for controlling said displacement varying means including a manually positionable link movable from a neutral position to a maximum speed position, a control link pivotal about a first axis at one end of said control link, cam means for translating said one one end of said control link, said manual link being connected to first pivot said control link and then translate the same, and means connecting said one end of the control link to said displacement varying means whereby the displacement varying means is moved during only a portion of the movement of the manual link.

10. A hydrostatic transmission comprising: a pump, means for varying the displacement of said pump from neutral to maximum displacement on both sides of neutral, a motor, means for varying the displacement of said motor from maximum displacement to minimum displacement, conduit means for delivering fluid from the pump to the motor and for returning fluid from the motor to the pump; and a linkage assembly for increasing the displacement of the pump and holding the motor in maximum displacement and thereafter decreasing the displacement of the motor and holding the pump in maximum displacement including a manually positionable link movable from a neutral position to maximum speed positions on both sides of neutral, a control link positionable by said manual link, cam means confining said control link to pivotal movement during a first portion of the movement of the manual link, a pump cam responsive to said pivotal movement of said control link for increasing the displacement of the pump during said first portion movement of the manual link, cam means permitting translation of said control link during a second portion of the movement of said manual link, and link means responsive to the translation of said control link for reducing the displacement of the motor in a second portion of the movement of the manual link.

References Cited

UNITED STATES PATENTS

| | | | |
|---|---|---|---|
| 2,505,727 | 4/1950 | Vickers et al. | 60—53 |
| 2,516,662 | 7/1950 | Vickers et al. | 60—53 |
| 3,126,707 | 3/1964 | Hann et al. | 60—53 |

EDGAR W. GEOGHEGAN, *Primary Examiner.*